US009719679B2

(12) United States Patent
Boen et al.

(10) Patent No.: US 9,719,679 B2
(45) Date of Patent: Aug. 1, 2017

(54) WASTE INCINERATION METHOD

(71) Applicant: Areva NC, Courbevoie (FR)

(72) Inventors: Roger Boen, Saint-Alexandre (FR); Patrice Charvin, Saint Romans (FR)

(73) Assignee: AREVA NC, Courbevoie (FR)

( * ) Notice: Subject to any disclaimer, the term of this patent is extended or adjusted under 35 U.S.C. 154(b) by 0 days.

(21) Appl. No.: 14/766,290

(22) PCT Filed: Feb. 13, 2014

(86) PCT No.: PCT/EP2014/052830

§ 371 (c)(1),
(2) Date: Aug. 6, 2015

(87) PCT Pub. No.: WO2014/125030

PCT Pub. Date: Aug. 21, 2014

(65) Prior Publication Data

US 2015/0369480 A1 Dec. 24, 2015

(30) Foreign Application Priority Data

Feb. 14, 2013 (FR) ..................................... 13 51262

(51) Int. Cl.

| | |
|---|---|
| ***B09C 1/06*** | (2006.01) |
| ***F23G 5/027*** | (2006.01) |
| ***G21F 1/06*** | (2006.01) |
| ***G21F 5/005*** | (2006.01) |
| ***G21F 9/14*** | (2006.01) |
| ***G21F 9/32*** | (2006.01) |
| ***F23G 5/44*** | (2006.01) |
| ***B09B 3/00*** | (2006.01) |
| ***B65D 1/38*** | (2006.01) |
| ***B65D 13/02*** | (2006.01) |

(52) U.S. Cl.

CPC ............ *F23G 5/027* (2013.01); *B09B 3/0025* (2013.01); *B09B 3/0083* (2013.01); *B65D 1/38* (2013.01); *B65D 13/02* (2013.01); *F23G 5/448* (2013.01); *G21F 1/06* (2013.01); *G21F 5/005* (2013.01); *G21F 9/14* (2013.01); *G21F 9/32* (2013.01); *F23G 2201/303* (2013.01); *F23G 2201/304* (2013.01); *F23G 2203/40* (2013.01)

(58) Field of Classification Search

CPC ................ B09C 1/06; F23G 5/16; B09B 3/00
USPC .......................................................... 588/321
See application file for complete search history.

(56) References Cited

U.S. PATENT DOCUMENTS

| | | | |
|---|---|---|---|
| 3,189,510 | A | 6/1965 | Eldred |
| 2011/0144408 | A1 | 6/2011 | Gruber |

FOREIGN PATENT DOCUMENTS

| | | | |
|---|---|---|---|
| EP | 0 143 364 | A1 | 6/1985 |
| EP | 2 112 423 | A1 | 10/2009 |
| FR | 2 293 769 | | 7/1976 |
| GB | 711 365 | | 6/1954 |
| GB | 1 528 478 | | 10/1978 |
| WO | 97/49641 | A2 | 12/1997 |

OTHER PUBLICATIONS

International Search Report issued in Application No. PCT/EP2014/052830 dated May 2, 2014.
Written Opinion issued in Application No. PCT/EP2014/052830 dated May 2, 2014.
Search Report issued in French Patent Application No. FR 13 51262 dated Oct. 25, 2013.
International Preliminary Report on Patentability issued in Application No. PCT/EP2014/052830 dated Jun. 1, 2013.
U.S. Appl. No. 14/766,791, "Induction Furnace and Method for Treating Metal Waste to be Stored" filed Aug. 10, 2015.

*Primary Examiner* — Edward Johnson

(74) *Attorney, Agent, or Firm* — Pearne & Gordon, LLP

(57) ABSTRACT

A basket for incinerating waste inside an incinerator for a duration longer than fifteen minutes with no need for waste to be molten earlier, particularly when waste is introduced inside the incinerator. The basket includes mainly of a glass fiber envelope: it is preferably stiffened by a lightweight metal structure located inside or outside the envelope or built into it. A gripping handle is installed on top of the assembly that is stiffened at the top by a metal tube to which a lightweight metal structure is fixed and by a base formed from a drip pan fixed to the base of the lightweight metal structure.

2 Claims, 5 Drawing Sheets

WASTE INCINERATION METHOD

DOMAIN OF THE INVENTION

Figure 1:
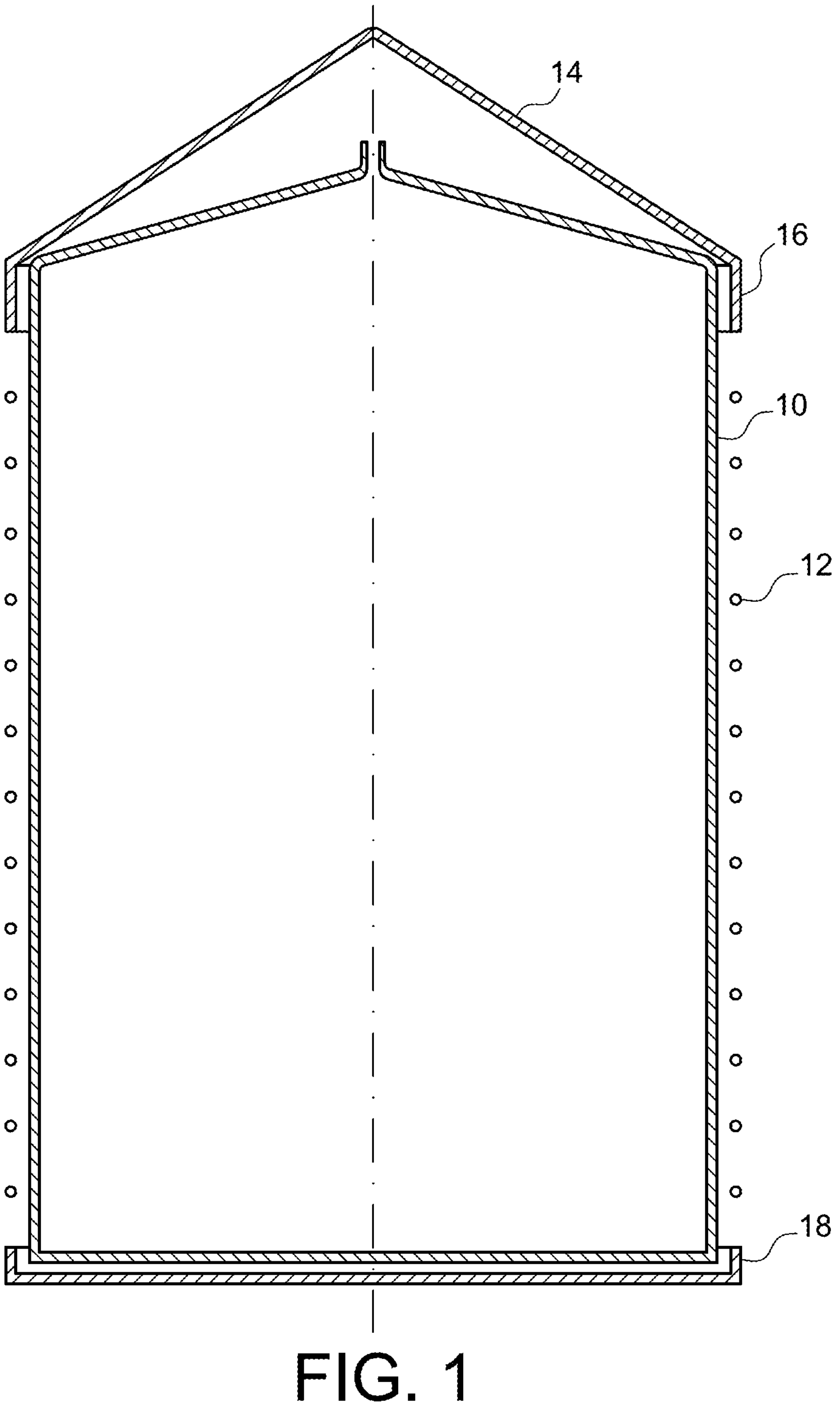

The invention relates to melting and incineration of more or less toxic metallic, organic and inorganic materials and waste, such as oxides, glass, phosphates and metals, in a furnace.

PRIOR ART AND PROBLEM THAT ARISES

Several methods are currently used to incinerate and/or vitrify mixes of metallic, organic and inorganic waste in a continuous feed furnace. The waste is firstly ground and continuously delivered into the furnace. This solution has the advantage of continuous operation of the incinerator and it minimises the size of the furnace and treatment of gases. However, this solution requires prior grinding of the waste that may be difficult in practice.

A second solution consists of introducing unground waste in packets, through a lock separating the internal atmosphere of the furnace from the external atmosphere. This second solution avoids grinding but it introduces a number of risks and problems, namely:

1) difficult manipulation of waste packets in the inlet lock with a risk of melting or flow of organic materials in the lock subsequent to the temperature rise when the furnace side lock door is open;

2) risk of inflammation of organic materials in the lock and overheating in this lock and its closing systems;

3) a risk of excessively fast combustion of the added waste packet as it is introduced into the furnace. This requires oversizing of the oxidising gas supply and of the gas treatment installation;

4) a risk of mechanical entrainment of flyash and toxic elements during fast combustion of the waste packet.

In the current state of the art, the metal container containing the waste can be used as a shuttle to bring waste into the furnace. In this case, it can gradually be cut in the furnace to limit the combustion rate, but it can no longer be recycled and it accounts for a non-negligible proportion of the final waste.

The cutting system, for example using a plasma torch installed in the furnace is also complex and expensive. One alternative consists of placing the waste packet in a cardboard box that acts as a shuttle. This solution limits risks in the lock but it does not solve the problem of the combustion rate of the waste packet as soon as the cardboard box has burned.

Therefore the purpose of the invention is to avoid the above-mentioned disadvantages related to the solutions described above by presenting another method and another device for adding waste into the furnace.

Furthermore, with French patent application FR 2 293 769, an installation intended for a radioactive waste conditioning press is known in which a receptacle is burned with its contents, and this receptacle is made from glass fibre among other materials.

PRESENTATION OF THE INVENTION

A first main objective of the invention is a basket that will contain waste to be inserted into and incinerated in an incinerator.

According to the invention, this basket is composed of a glass fibre envelope, among other materials. Ash from combustion may be melted in the furnace, within a molten glass bath. In this case, the basket formed particularly by the glass fibre envelope containing ash or combustion residues from the waste will be dissolved in the glass bath.

The first embodiments use a lightweight metal structure to increase the stiffness of the basket. This metal structure is preferably composed of a mesh.

According to a first embodiment, said lightweight metal structure is external and an internal envelope composed of glass fibre is located inside the lightweight metal structure.

In a second embodiment, this envelope composed of glass fibres is external and the lightweight metal structure is internal and therefore located inside the glass fibre envelope.

The glass fibres forming the envelope can also be woven, weaving having a mesh size defining a porosity adapted to the type of waste so that the pyrolysis rate of this waste can be thermochemically controlled.

In this case, it could be envisaged that the lightweight metal structure could be composed of a mesh for which the wires are included in the fibre weaving, thus forming a single envelope.

A second main purpose of the invention is a method for vitrification of waste in a waste vitrification incinerator.

According to the invention, it comprises at least two phases consisting of:

- placing the waste to be incinerated in a glass fibre basket like that defined above to be kept in it in a gas atmosphere above a molten glass bath; and
- perform pyrolysis and a combustion for a duration longer than a pyrolysis and combustion of waste without a basket (the incineration time is multiplied by a factor of three or even ten depending on the basket), so that complete combustion can be achieved without the presence of carbon monoxide in the incinerator exhaust gases.

Preferably, after complete combustion of the waste, the glass fibre basket containing waste combustion residues is dissolved in the glass bath.

LIST OF FIGURES

Figure 2:
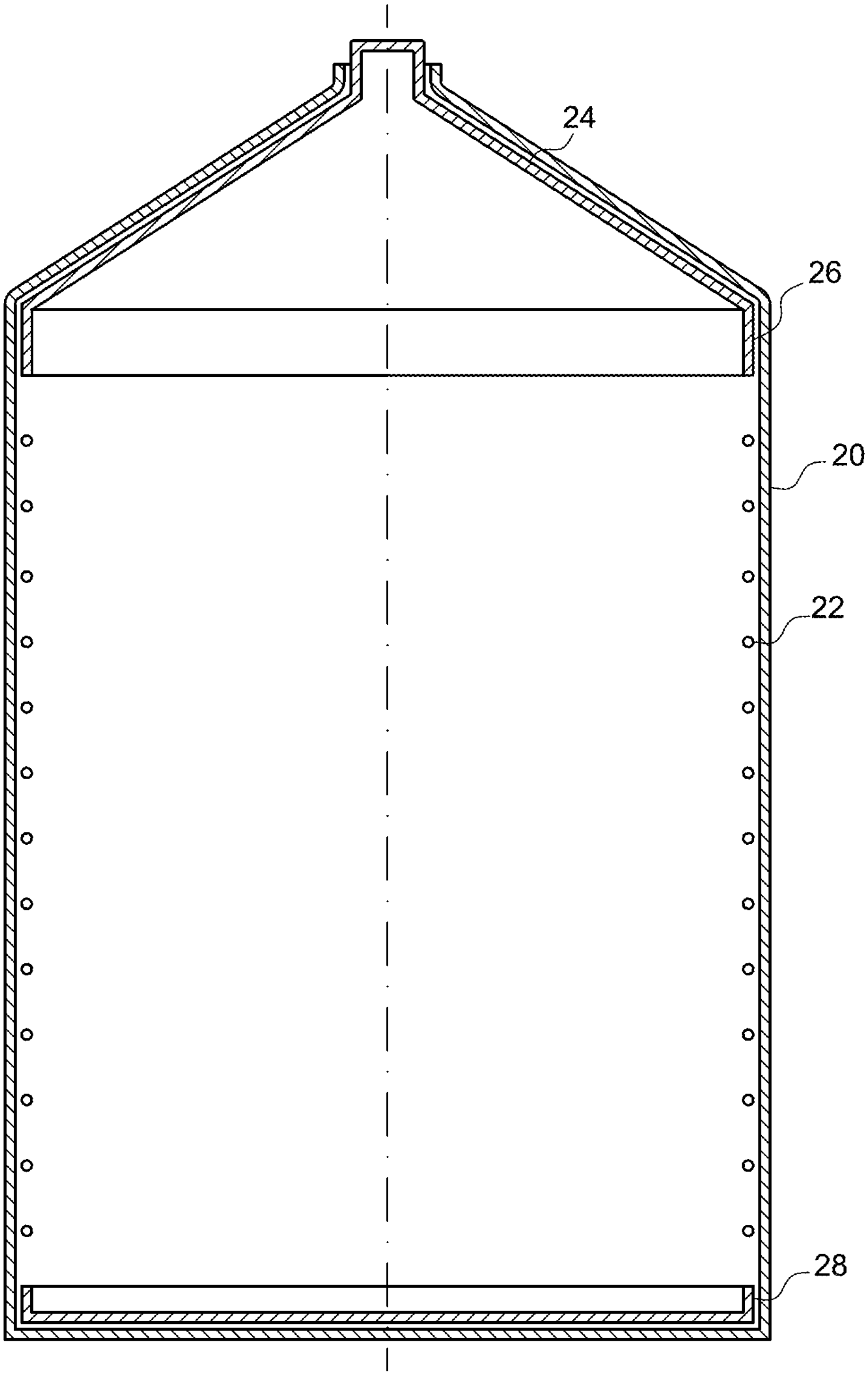
Figure 3:
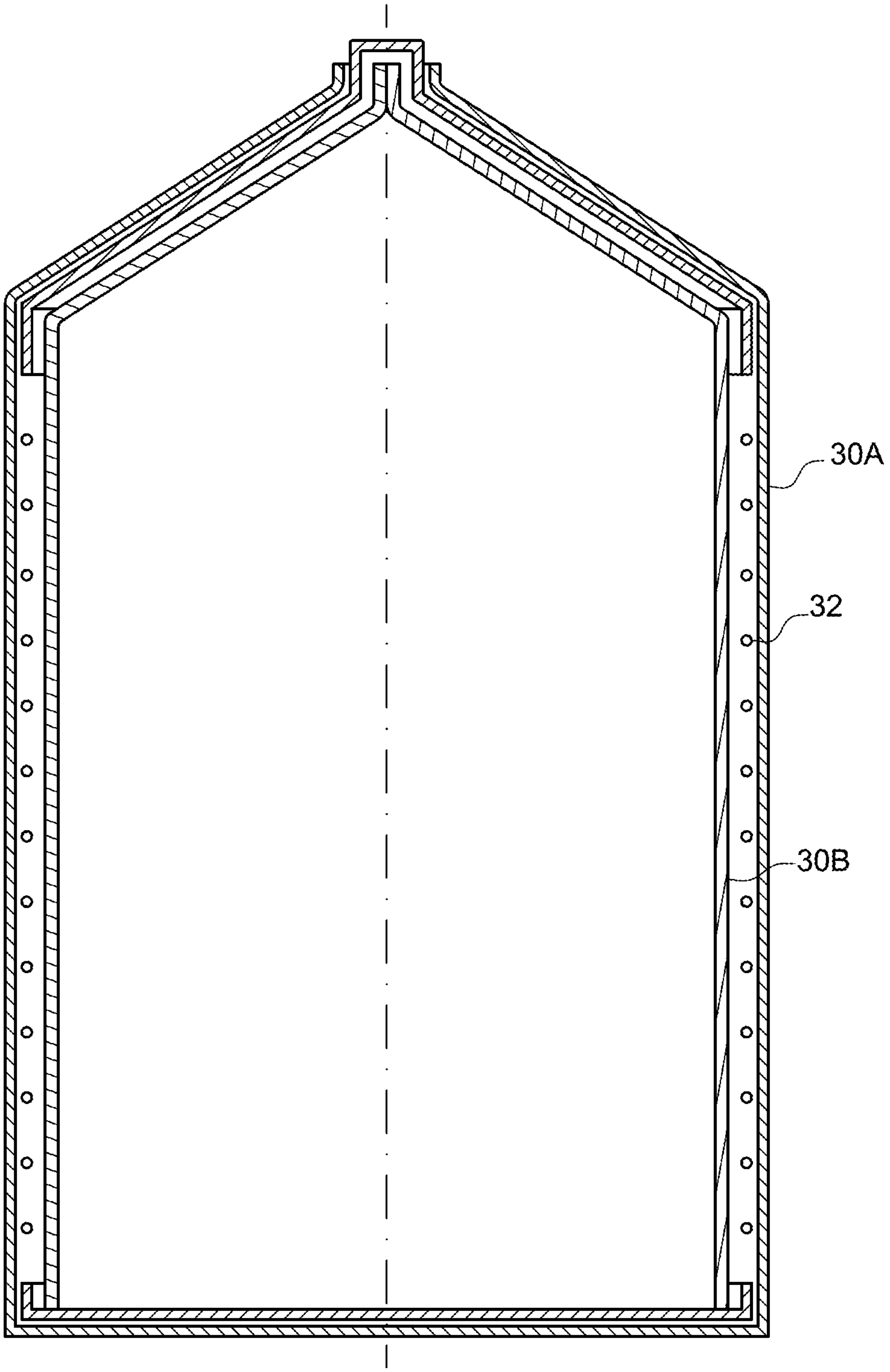
Figure 4:
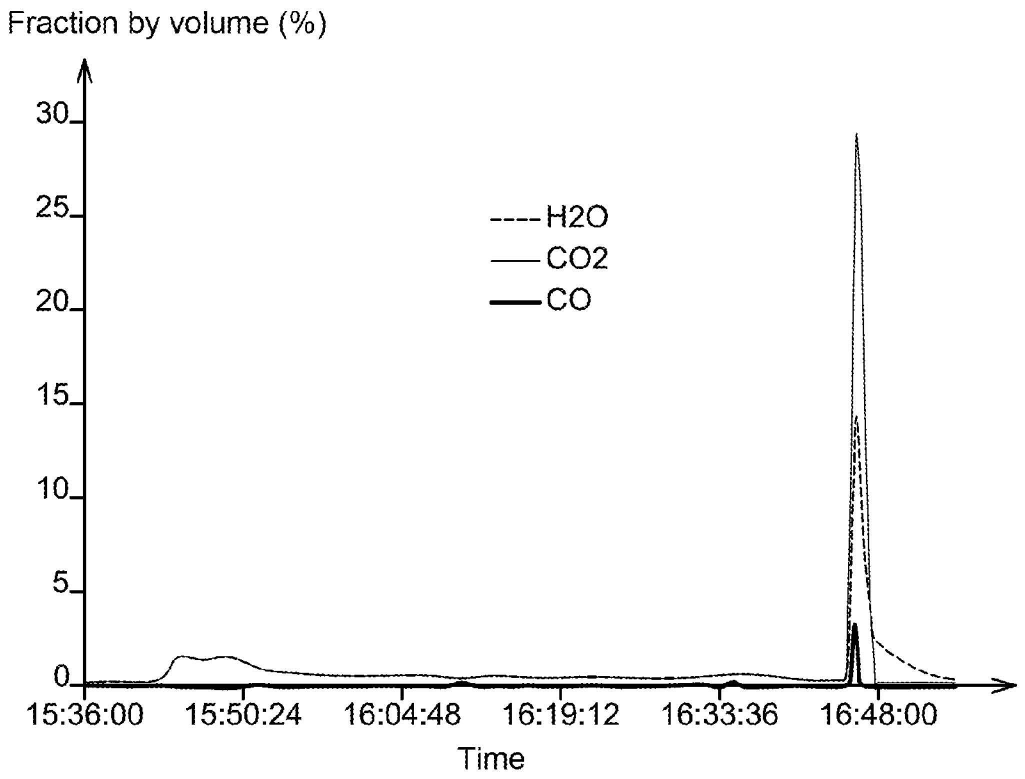
Figure 5:
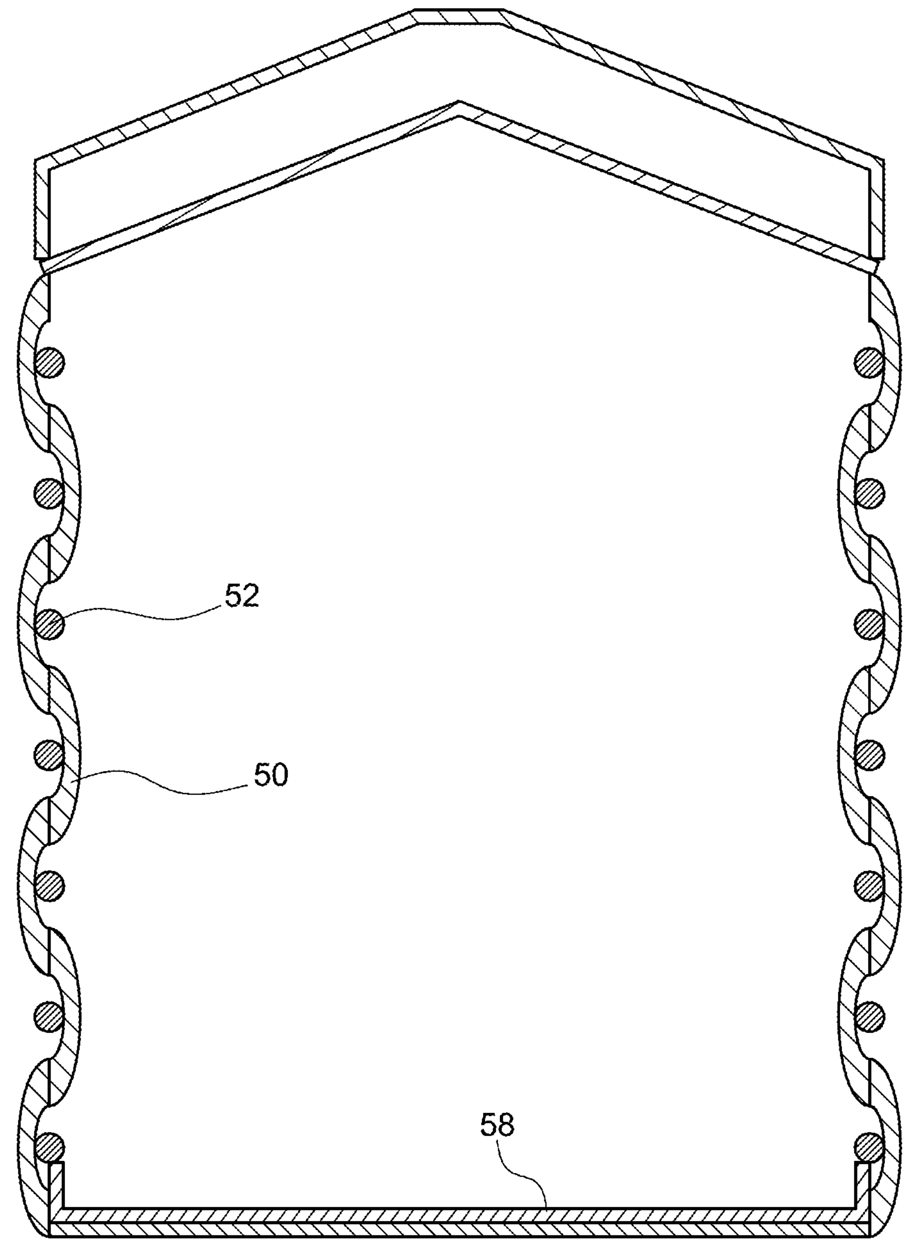

The invention and its technical characteristics will be better understood after reading the description that is accompanied by several figures representing the following respectively:

FIG. 1, a sectional view of a first embodiment of the basket according to the invention;

FIG. 2, a sectional view of a second embodiment of the basket according to the invention;

FIG. 3, a sectional view of a third embodiment of the basket according to the invention;

FIG. 4, a graph illustrating operation of the method according to the invention; and FIG. 5, a sectional view of a fourth embodiment of the basket according to the invention.

DETAILED DESCRIPTION OF SEVERAL EMBODIMENTS OF THE INVENTION

The concept according to the invention consists of putting the waste packet to be incinerated into a basket composed largely of unwoven or more or less tightly woven glass fibre. The tightness of the glass fibre(s) makes it possible to manage contact between the contained waste and the hot and oxidising atmosphere inside the incinerator, weaving allowing variable thermal and gas exchanges. The basket is preferably stiffened by a lightweight metal structure.

The use of non-combustible glass fibre with a high melting point allows mechanical transfer of the waste bag from the waste inlet lock to the incineration zone, thus preventing any loss of content of the basket during the transfer.

The principle of using the glass fibre for making the basket is that this glass fibre surrounds the waste basket and thus delays its temperature rise. This prevents excessively fast fusion and/or pyrolysis of the organic waste, particularly during transfer from the inlet lock to the incinerator.

In the furnace (or incinerator), the content of the basket, namely the waste, is heated progressively. This temperature rise leads to pyrolysis of organic materials. Pyrolysis gases escape from the basket to burn in the oxidising atmosphere of the furnace. The choice of the glass fibre envelope that partly forms the basket, and its porosity and the tightness of its weaving can slow heat transfers towards the inside of the basket and gas transfers towards the outside. Thus, the size of the woven mesh is adapted to the type of waste. Therefore this can manage the pyrolysis and combustion rate of the waste contained in the basket. This thus minimises the size of gas gusts generated by sequential inlet of complete waste bags into the incinerator.

Furthermore, the porosity of the glass fibre envelope forming the basket with its more or less tight weaving, also helps to minimise losses of ash and non-volatile toxic elements contained in the gases inside the incinerator. Therefore this porosity can be adapted to the size of the solid toxic particles which must not be entrained in the gases.

With reference to FIG. 1, according to a first embodiment of the basket according to the invention, the envelope 10 composed of glass fibre is located inside the lightweight metal structure 12. This lightweight metal structure is welded to the bottom of the basket that is advantageously composed of a drip pan 18 located below the envelope 10. The mesh advantageously forming the lightweight metal structure 12 is preferably cylindrical and is welded at the top to a metal tube 16 that will stiffen it. The function of the drip pan 18 forming the bottom of the basket is to collect any metal drops or other molten material drops if the waste contains this type of material with a low melting point that could, for example, melt prematurely in the inlet lock (in another type of embodiment the drip pan could be made of very tightly woven glass fibres that are made practically leak tight to liquids). In this embodiment, the entire basket is completed by a gripping handle 14 fixed on and above the metal tube 16.

In one example of this embodiment, the inside diameter of the envelope 10 made of glass fibre is equal to about 500 mm and its height is about 750 mm. In this case, the weight of the envelope is of the order of 1 kg for glass fibre woven at 45° with a mass per unit area equal to 600 g/$m^2$. The drip pan 18 is preferably made of stainless steel and its thickness is of the order of one millimeter. The mesh forming the lightweight metal structure 12 is a stainless steel wire with a diameter of between 2 and 5 mm.

In this first embodiment, the large outside diameters for manipulations of the basket in the lock and in the incineration zone are fixed by the lightweight metal structure 12 used.

With reference to FIG. 2, the second embodiment according to the disclosed invention uses a glass fibre envelope 20 located outside the lightweight metal structure 22. This lightweight metal structure is also composed of a cylindrical mesh welded at the top to a metal tube 26 above which there is a gripping handle 24. The base of the assembly is preferably composed of a drip pan 28 that can be installed inside the glass fibre envelope 20. In this embodiment, this makes it easier to fill the basket with waste.

With reference to FIG. 5, the mesh wires forming the lightweight metal structure 52 are integrated into the weaving of the glass fibre forming the envelope 50. The drip pan 58 can then be installed inside or outside the glass fibre envelope 50. In the embodiment shown, the glass fibres forming the envelope pass alternately on opposite sides of the mesh wires forming the lightweight metal structure 52. This version is difficult to make, but it combines the advantages of the two previously disclosed embodiments.

With reference to FIG. 3, according to a third embodiment, the basket comprises two glass fibre layers 30A and 30B placed one inside the other. The function of the outer layer 30A is to filter pyrolysis gases to remove dust. The function of the inner layer 30B is to contain waste with appropriate mechanical strength properties. Note that the function or the position of the two layers could also be inverted. These two layers 30A and 30B are preferably separate. The lightweight metal structure 32 is then located between these two layers 30A and 30B. These three elements 30A, 30B and 32 may be attached to each other by stitching with glass fibres or metal wire.

Therefore the incineration method according to the invention uses the basket mentioned above to incinerate waste inside an incinerator for a duration at least fifteen minutes longer than for pyrolysis and combustion of waste without a basket (incineration time increased by a factor of three or even ten depending on the basket). The waste is thus placed above a molten glass bath above which there is a combustion zone in an atmosphere of oxygen diluted in argon and heated by arc plasma transferred between two electrodes.

FIG. 4 shows water, carbon dioxide and carbon monoxide contents in outlet gases from the vitrification incinerator as a function of time. Water is shown in dashed lines, carbon dioxide in thick lines and carbon monoxide in thin lines.

It can be seen that if waste is sent directly to the surface of a molten glass bath, at time denoted 16h45, the duration of pyrolysis and combustion is very short, in other words of the order of 3 minutes and the added oxygen is insufficient to guarantee complete combustion of the gust of pyrolysis gas. There is a remaining content of the order of 3 to 4% of carbon monoxide in the gas at the outlet from the reactor.

If a basket according to the invention is used, particularly together with its glass fibre envelope, waste is kept suspended above a melting glass bath at time marked 15h42. Its combustion time is increased to 17 minutes until time marked 15h59. This can give complete combustion without the presence of carbon monoxide in the reactor outlet gases.

This result is obtained with the glass fibre envelope acting to retard the beginning of combustion 1, and delay pyrolysis/combustion. This results in complete combustion of waste without oversizing the installation, and particularly the supply of oxidising gas and gas treatment. It also very much minimises the presence of combustion gases at the outlet from the installation.

What is claimed is:

1. Method for incinerating waste in a waste vitrification incinerator, the method including steps of:

placing the waste to be incinerated in a support basket of waste to be inserted into and incinerated in the incinerator, the support basket comprising an envelope made of at least a coating of glass fibre stiffened by a lightweight metal structure, the envelope being woven with a mesh size defining a porosity adapted for:

maintaining the waste in the basket during introducing the basket into the incinerator, controlling thermochemically the speed of the pyrolysis of the waste, particularly the progressive rising of the temperature of the waste until the entire incineration of the waste in the basket, and filtering the pyrolysis gas, wherein the support basket and the waste are disposed in a gas atmosphere, above a molten glass bath, and performing a pyrolysis and a combustion, confining toxic particles in the basket for a duration longer than a pyrolysis and combustion of waste without a basket so that complete combustion can be achieved.

2. Method according to claim 1, wherein after complete combustion of the waste, the glass fibre basket containing waste combustion residues is dissolved in the molten glass bath.

* * * * *